(12) United States Patent
Enters

(10) Patent No.: US 11,149,858 B2
(45) Date of Patent: Oct. 19, 2021

(54) VALVE

(71) Applicant: DELPHI TECHNOLOGIES IP LIMITED, St. Michael (BB)

(72) Inventor: Richard Enters, Vineuil (FR)

(73) Assignee: DELPHI TECHNOLOGIES IP LIMITED

( * ) Notice: Subject to any disclaimer, the term of this patent is extended or adjusted under 35 U.S.C. 154(b) by 0 days.

(21) Appl. No.: 16/753,219

(22) PCT Filed: Oct. 1, 2018

(86) PCT No.: PCT/EP2018/076683
§ 371 (c)(1),
(2) Date: Apr. 2, 2020

(87) PCT Pub. No.: WO2019/068657
PCT Pub. Date: Apr. 11, 2019

(65) Prior Publication Data
US 2020/0325994 A1    Oct. 15, 2020

(30) Foreign Application Priority Data
Oct. 2, 2017 (FR) ...................................... 1759204

(51) Int. Cl.
*F16K 1/38* (2006.01)
*F02M 63/00* (2006.01)
(Continued)

(52) U.S. Cl.
CPC ......... *F16K 1/385* (2013.01); *F02M 61/1893* (2013.01); *F02M 63/0073* (2013.01);
(Continued)

(58) Field of Classification Search
CPC ....... F16K 1/385; F16K 1/42; F02M 2200/03; F02M 61/1893; F02M 61/1886; F02M 63/0077; F02M 63/0073
See application file for complete search history.

(56) References Cited

U.S. PATENT DOCUMENTS 2,726,843 A * 12/1955 Evans ...................... F16K 1/42
251/333
5,983,927 A * 11/1999 Simon ................. B05B 11/3067
137/516.27
(Continued)

FOREIGN PATENT DOCUMENTS

DE       10255328 A1    6/2004
DE    102010002637 A1    9/2011
(Continued)

*Primary Examiner* — Jessica Cahill
*Assistant Examiner* — Patrick C Williams
(74) *Attorney, Agent, or Firm* — Joshua M. Haines

(57) ABSTRACT

A valve assembly includes a valve member and a valve body. The valve body has a contact surface intended to come into contact with an adjacent contact member The valve body also has a channel having an end portion opening to the outside of the valve body at at least one end opening, a valve member seat encircling a passage cross-section of the end portion of the channel, and an intermediate surface extending between the contact surface and the end opening. The valve member is capable of engaging with the valve member seat by contact in order to prevent a flow in the channel. The valve body has a groove provided on the intermediate surface, the groove encircling the valve member seat.

9 Claims, 4 Drawing Sheets

(51) Int. Cl.
*F02M 61/18* (2006.01)
*F16K 1/42* (2006.01)

(52) U.S. Cl.
CPC ........... *F02M 63/0077* (2013.01); *F16K 1/42* (2013.01); *F02M 61/1886* (2013.01); *F02M 2200/03* (2013.01)

(56) References Cited

U.S. PATENT DOCUMENTS

| | | | | |
|---|---|---|---|---|
| 2003/0098074 | A1* | 5/2003 | Kayahara | ............ F16K 31/0693 137/557 |
| 2011/0180635 | A1 | 7/2011 | Spiers et al. | |
| 2012/0288389 | A1* | 11/2012 | Kuroyanagi | .............. F16K 1/54 417/559 |
| 2014/0034155 | A1* | 2/2014 | Askew | ............... G05D 16/0666 137/505 |
| 2014/0190578 | A1* | 7/2014 | Hayashi | ................ F16K 31/007 137/486 |

FOREIGN PATENT DOCUMENTS

| | | |
|---|---|---|
| DE | 102010040940 A1 | 3/2012 |
| DE | 102011089360 A1 | 6/2013 |
| WO | 2012059265 A1 | 5/2012 |
| WO | 2014000959 A1 | 1/2014 |

\* cited by examiner

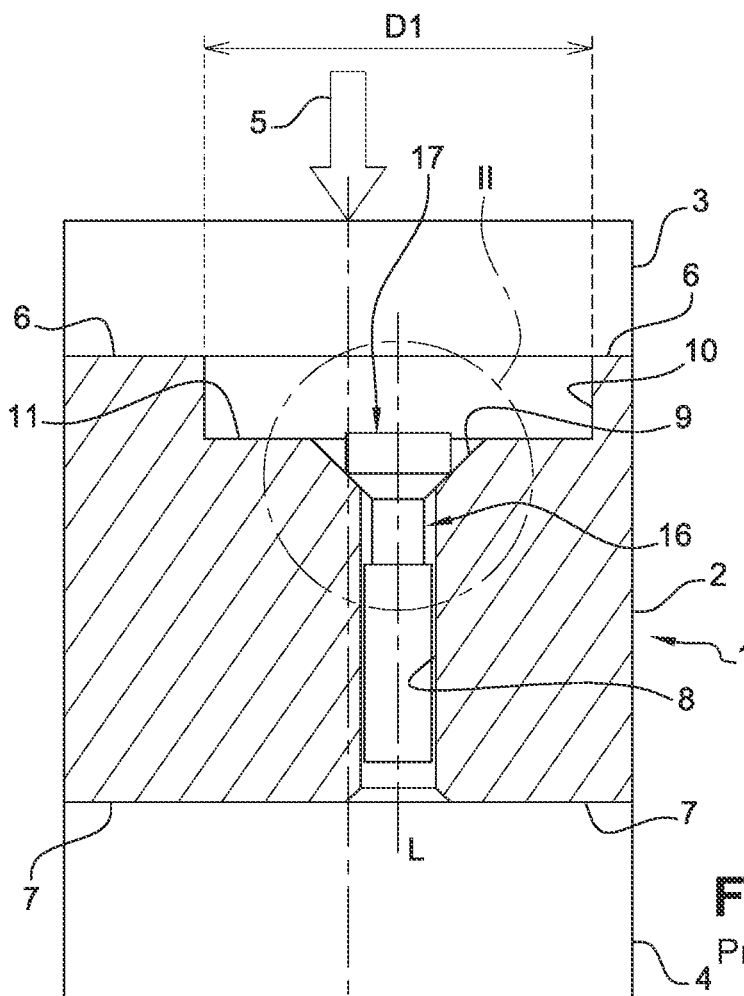
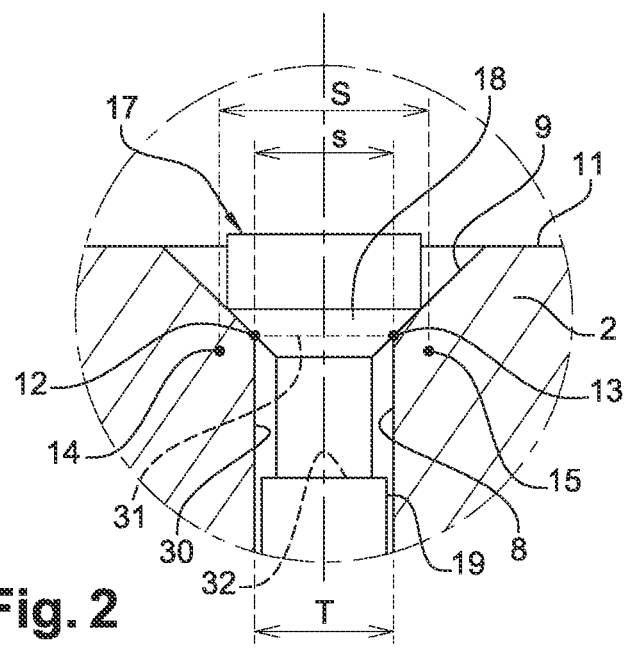
Fig. 1
Prior Art
Fig. 2
Prior Art

VALVE

CROSS REFERENCE TO RELATED APPLICATIONS

This application is a national stage application under 35 USC 371 of PCT Application No. PCT/EP2018/076683 having an international filing date of Oct. 1, 2018, which is designated in the United States and which claimed the benefit of FR Patent Application No. 1759204 filed on Oct. 2, 2017, the entire disclosures of each are hereby incorporated by reference in their entirety.

TECHNICAL FIELD

The present invention relates to a valve comprising a valve body and a valve member.

TECHNOLOGICAL BACKGROUND OF THE INVENTION

FIG. 1 shows a valve according to the prior art. The valve 1 is arranged between a component 3 and a component 4 that can move relative to one another, as shown by the arrows 5.

The valve 1 comprises a valve body 2 made from elastically deformable material, for example steel. The first component 3 is in contact with the valve body 2 at a contact surface 6 of the valve body. The second component 4 is also in contact with the valve body 2 at a contact surface 7 of the valve body. The contact surfaces 6 and 7 are arranged, respectively, on opposite faces of the valve body 2. When they move relative to one another, the components 3 and 4 are able to exert a pressure on the valve body, respectively at the contact surfaces 6 and 7. On the side of the contact surface 6, the valve body 2 has a recess 10.

A channel 8 is provided in the valve body. The channel 8 has an end opening which opens in the recess 10 and an end opening which opens at the contact surface 7. The channel is substantially rectilinear and extends in a longitudinal direction L. At the end opening which opens in the recess 10, the channel 8 has a cross section that widens progressively such as to define a frustoconical surface. The frustoconical surface forms a valve member seat 9. An intermediate surface 11 extends between the contact surface 6 and the valve member seat 9.

According to FIGS. 1 and 2, the valve 1 is a balance valve that also comprises a valve member 16. The valve member 16 comprises a head 17 that has a frustoconical portion 18. The valve member 16 also comprises a rod 19 that extends in the channel 8 in the direction of the longitudinal axis L. The rod 19 has a portion of reduced cross section that, in the channel 8, defines an interior chamber 30. The interior chamber 30 is delimited by a section 31 defined by a line of contact between the frustoconical portion 18 and the valve member seat 9, and a section 32 defined by a shoulder that limits the portion of reduced cross section of the rod 19. A conduit (not shown) formed in the body 2 opens in the interior chamber 30.

The valve member 16 is able to move between a closed off position represented in FIG. 1, in which the frustoconical portion 18 cooperates with the valve member seat 9 such as to prevent a flow between the interior chamber 30 and the recess 10, and an open position, in which the valve member 16 allows a flow between the interior chamber 30 and the recess 10. A spring (not shown) urges the valve member 16 toward its closed off position.

The valve member 16 is subject to different forces. In particular, the valve member 16 is subject to the force exerted by the fluid present in the interior chamber 30 on the sections 31 and 32. Although the sections 31 and 32 have the same surface area, these two forces are balanced with the clearance between the body and the rod. Thus, when the other forces exerted on the valve member 16, particularly by the spring, are balanced relative to one another, the valve member 16 is in balance, i.e. the valve member is in the closed position by virtue of the action of the spring. Conversely, if the sections 31 and 32 do not have the same surface area, these two forces are not balanced and the valve member 16 is not in balance.

FIG. 2 shows a detail of FIG. 1 at the valve member head 17. The frustoconical portion 18 is in contact with the valve member seat 9 at a line of contact that encircles the section 31. In the sectional view of FIG. 2, this line of contact is shown by a point 12 and a point 13. FIGS. 1 and 2 show the valve body 2 when the components 3 and 4 (not shown) are not exerting substantial pressure on the contact surfaces 6 and 7 (not shown). In this case, the line of contact is substantially circular and has a diameter s, and the channel 8 has, at the section 32, a diameter T equal to the diameter s. The sections 31 and 32 thus have the same surface area and the valve member 16 is in balance.

According to FIGS. 1 and 2, when the components 3 and 4 move in such a manner as to exert a substantial pressure on the contact surfaces 6 and 7, a stress field is created in the valve body 2. This stress field corresponds to a deformation field of the valve body 2. Owing to this deformation field, the line of contact between the frustoconical portion 18 and the valve member seat 9 is modified. In the sectional view of FIG. 2, this line of contact is shown by means of the points 14 and 15. It is not necessarily perfectly circular and may be characterized by a dimension S. The channel 8 is also deformed and the diameter T is modified. It will thus be noted that the surface areas of the sections 31 and 32 are dependent on the pressure exerted by the components 3 and 4 on the contact surfaces 6 and 7 of the valve body 2, and are no longer equal. Generally, the surface area 31 increases more than does the surface area of the section 32.

The valve of FIG. 1 thus presents the drawback of the valve member 16 not always being balanced; on the contrary, the force is exerted on the valve member 16 vary as a function of the conditions of use of the valve body 2 and, more particularly, of the pressure exerted by the components 3 and 4 on the valve body 2.

An object of the present invention is to provide a solution that resolves these drawbacks.

SUMMARY OF THE INVENTION

One of the objects of the invention is to provide a valve in which the dimensions of the valve member seat do not vary or vary to a great extent as a function of the conditions of use. The present invention proposes a valve comprising a valve member and a valve body, said valve body having a contact surface designed to enter into contact with an adjacent contact member, a channel having an end portion opening to the exterior of the valve body at at least one end opening, a valve member seat encircling a passage cross section of said end portion of the channel and an intermediate surface extending between said contact surface and said end opening, said valve member being capable of cooperating with said valve member seat such as to prevent a flow through said end opening, characterized in that said valve body has a groove provided at said intermediate surface, said groove encircling said valve member seat.

By virtue of these features, the dimensions of the valve member seat are substantially stable, as a function of the conditions of use. When the contact member exerts a pressure on the contact surface of the valve body, a stress field is created in the valve body. However, the groove that encircles the valve member seat isolates the valve member seat to a certain extent from the rest of the valve body in such a manner that the stress field at the valve member seat and the corresponding deformation field are of limited extent.

According to a particular embodiment, said valve member comprises a head capable of cooperating with said valve member seat and a rod that extends in said channel, said rod having, from said head, a portion of reduced cross section that defines an interior chamber in said channel, a conduit that opens in said interior chamber being provided in said valve body.

In this embodiment, the groove makes it possible to prevent or to limit a variation of the sections that limit the interior chamber. Thus, in the case of a balance valve, balancing of the valve member is not modified or is slightly modified by the conditions of use.

Preferably, the end portion of the channel has a longitudinal orientation that intersects said intermediate surface at said end opening.

Advantageously, said groove, seen parallel to said longitudinal orientation, is circular.

In a particular embodiment, said end portion of the channel has a circular transverse section, said groove being concentric with said end portion of the channel.

Preferably, said groove has a circular cylindrical central wall with a directrix parallel to said longitudinal orientation, a back wall extending radially from said cylindrical central wall and a frustoconical exterior wall forming a non zero angle relative to said longitudinal orientation, which extends from the back wall to said intermediate surface.

Preferably, the joint between said cylindrical central wall and said back wall is, seen in cross section, an arc of a circle with a given radius of curvature.

Advantageously, said valve member is capable of cooperating with said valve member seat by contact at a contact zone of said valve member seat, said groove extending depth wise parallel to the longitudinal direction of said end portion of the channel at least substantially as far as the depth of said contact zone.

Preferably, said groove extending depth wise parallel to the longitudinal direction of said end portion of the channel at least as far as double the depth of said contact zone.

In a particular embodiment, the groove has at least one first portion extending as far as a first groove depth and one second portion extending as far as a second groove depth.

Preferably, the groove has at least one portion extending as far as a groove depth substantially greater than said seat depth and extending along said channel. For example, the depth of the groove corresponds to the end of the portion of reduced cross section of the rod of the valve member.

By virtue of these features, the groove portion extending as far as a depth substantially greater to the seat depth isolates the channel to a certain extent in such a manner that the stress field and the corresponding deformation field along the channel are of limited extent, thereby reducing the deformations of the channel.

BRIEF DESCRIPTION OF THE DRAWINGS

Other features, objects and advantages of the invention will become apparent on reading the following detailed description and with reference to the appended drawings, which are given by way of non limiting example, and in which:

FIG. 1 is a sectional view of a prior art valve,

FIG. 2 shows a detail of FIG. 1,

The invention is now described with reference to the figures and, for the purposes of clarity and conciseness of the description, a downward orientation within the meaning of FIG. 1 will be used, without implying a limitation in terms of the scope of protection, in particular with regard to the different installations of an injector in a vehicle. Words such as "top, bottom, below, above, vertical, rise, fall, etc." will be used without implied limitation.

Figure 3:
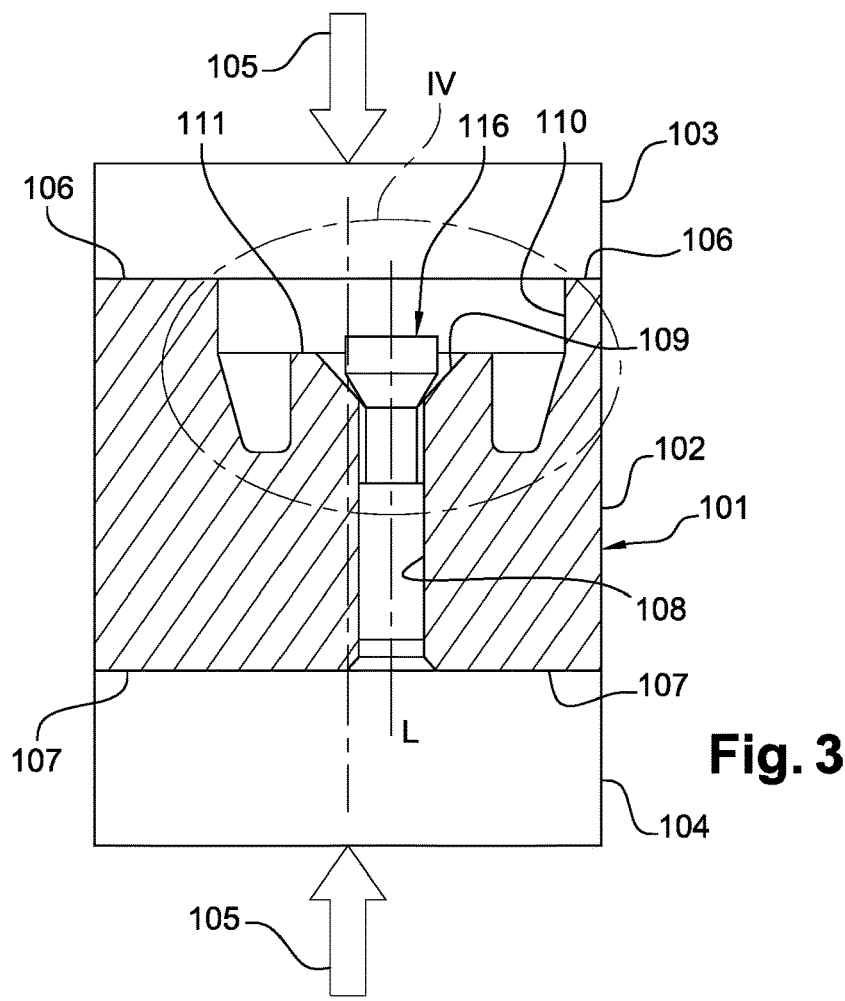
FIG. 3 is a sectional view of a valve according to a first embodiment of the invention.
Figure 4:
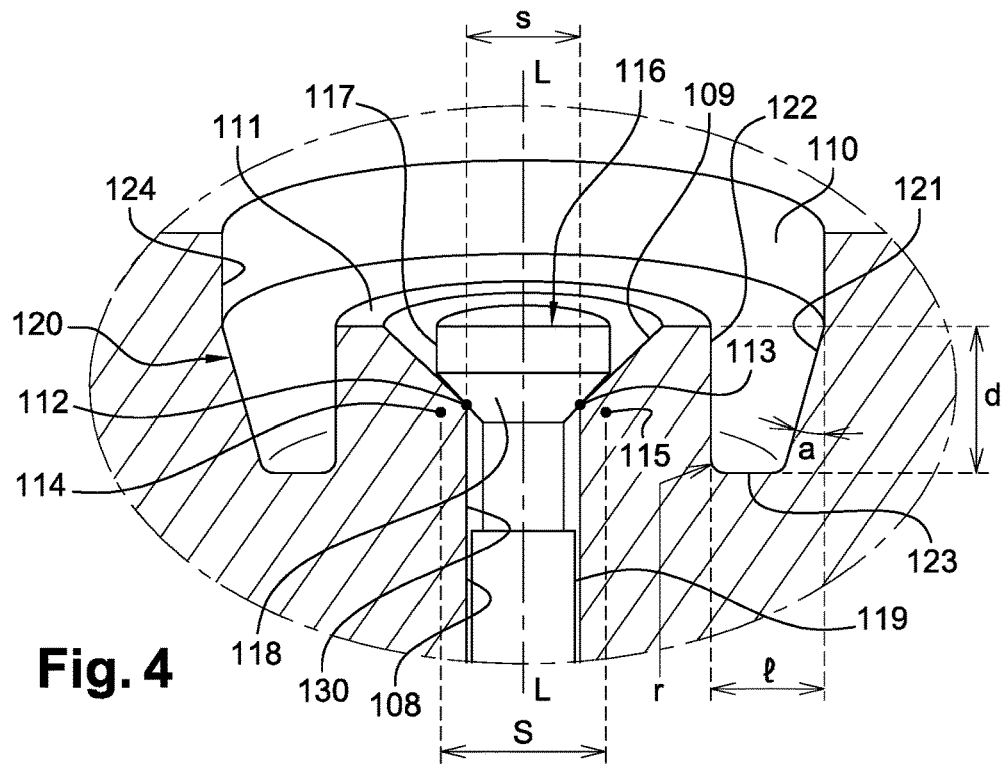
FIG. 4 shows a detail of FIG. 3.

FIGS. 3 and 4 show a valve according to a first embodiment of the invention. Elements that are identical or similar to elements of the valve of FIG. 1 are denoted by the same reference numerals, increased by 100, and will not be described in greater detail. A circular groove 120 is formed in the valve body 102 of the valve 101 at the intermediate surface 111.

More precisely, the groove 120 is defined by a circular cylindrical wall 122 with a directrix parallel to the axis L by a back wall 123, perpendicular to the wall 122 and parallel to the intermediate surface 111, and by a frustoconical wall 121 that extends from the wall 123 to the lower edge of the wall 124 that delimits the recess 110. The wall 123 is located at a depth d measured parallel to the axis L relative to the intermediate surface 111. The frustoconical wall 121 forms an angle a relative to the direction of the axis L.

In another embodiment (not shown), the wall 122 is a frustoconical wall forming a non zero angle relative to the direction of the axis L The joint between the wall 122 and the wall 123, seen in cross section, is an arc of a circle with a radius of curvature r. Similarly, the joins between the wall 123 and the wall 121 and between the walls 121 and 124 are, seen in cross section, arcs of a circle of given radius of curvature.

As may be seen in FIG. 4, the depth d is approximately equal to double the distance between the intermediate surface and the line of contact between the frustoconical portion 118 and the valve member seat 109 shown by the points 112 and 113 in FIG. 4 and measured parallel to the axis L. However, a lesser depth may suffice. For example, a depth at least substantially equal to the aforesaid distance is deemed sufficient. The wall 122 is distant from the wall 124 by a distance l.

When the first component 103 and the second component 104 exert a pressure on the contact surfaces 106 and 107, a stress field is created in the valve body 102. The groove 120 isolates the valve member seat 109 from the surfaces 106 and 107 such that the stress field at the valve member seat 109 is of limited extent. The line of contact between the frustoconical portion of the valve member head 117 and the valve member seat 109 is represented by the points 112 and 113. When a pressure is exerted on the valve body 102 by the first and second components 103 and 104, the valve member seat is slightly deformed such that the line of contact is represented by the points 114 and 115 in FIG. 4. However, as the deformation of the valve member seat is limited, the points 114 and 115 are very close, respectively, to the points 112 and 113. The diameters is very close to the diameter S and the balancing of the valve member 116 is not substantially modified.

Figure 8:
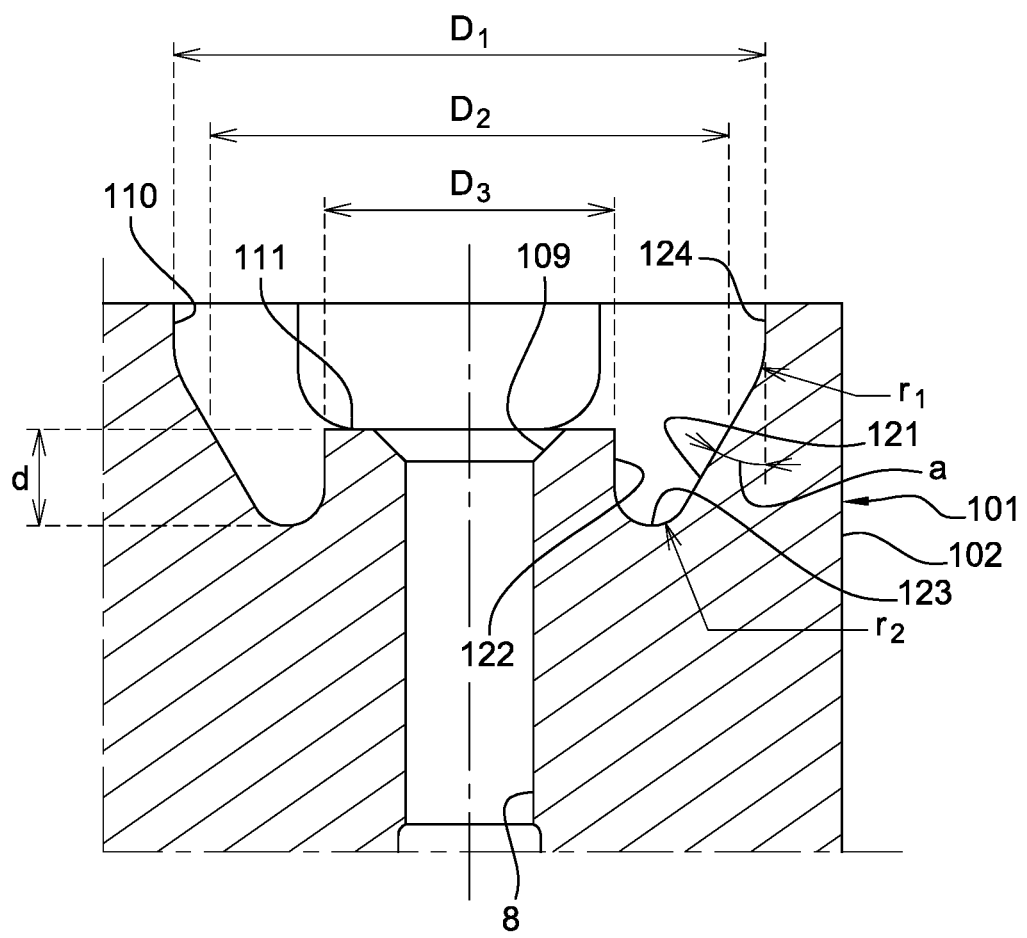
FIG. 8 is a sectional view of a valve according to a variant of the embodiment of FIG. 3.

FIG. 8 shows a valve according to a variant of the embodiment of FIG. 3. The same references are used. Only the differences between the variant of FIG. 8 and that of FIG. 3 are described below. The joint between the walls 121 and 124 is located above the plane of the intermediate surface 111. It has a radius of curvature r1. The wall 121 and the wall 122 are connected by a curved surface 123 that has a radius or curvature r2.

By way of example, it has been determined that, for the valve of FIG. 8, for which:
the radius r1=1 mm,
the radius r2=0.5 mm,
the depth of the groove d=2 mm,
the angle a=30°,
the recess 110 has a diameter D1=9.1 mm,
at the level of the surface 111, the wall 121 has a diameter D2=8.1 mm,
the wall 122 has a diameter D3=4.575 mm,
an applied axial load (cf. arrows 105 in FIG. 3) of 30000N,
the diameter S is greater than the diameter s by 1 µm (cf. FIG. 4).

By way of comparison, for a valve according to FIG. 1, for which the recess 10 has the same diameter D1=9.1 mm and a depth of 2 mm, and for an applied axial load of 30000N, the diameter S is greater than the diameter s by 3 µm (cf. FIG. 2).

Figure 5:
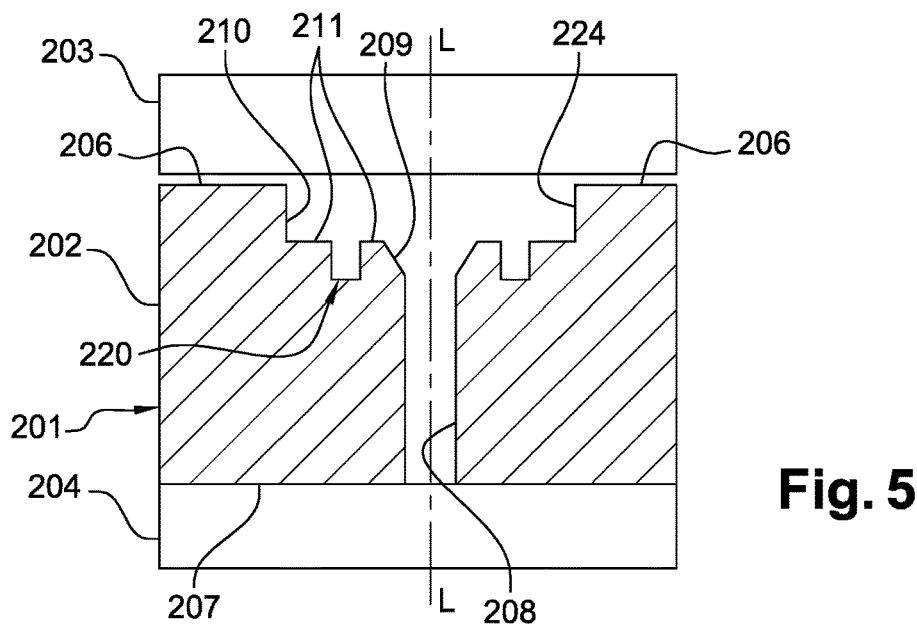
FIG. 5 is a sectional view of a valve according to a second embodiment of the invention.

FIG. 5 shows a valve body 201 according to a second embodiment of the invention. Elements that are identical or similar to the valve body 101 of FIG. 3 bear the same reference numerals increased by 100 and will not be described in further detail. The valve member is not shown in FIG. 5. However, naturally, the valve 201 comprises a valve member similar to the valve member 116 of FIG. 3. The valve 201 differs from the valve 101 in that the groove 220 is not hollowed out in the extension of the wall 224 of the recess 210. On the contrary, the groove 220 is hollowed out at a circular ring of intermediate position between the valve member seat and the wall 224. In other words, portions of the intermediate surface 211 are located on either side of the groove 220.

Figure 6:
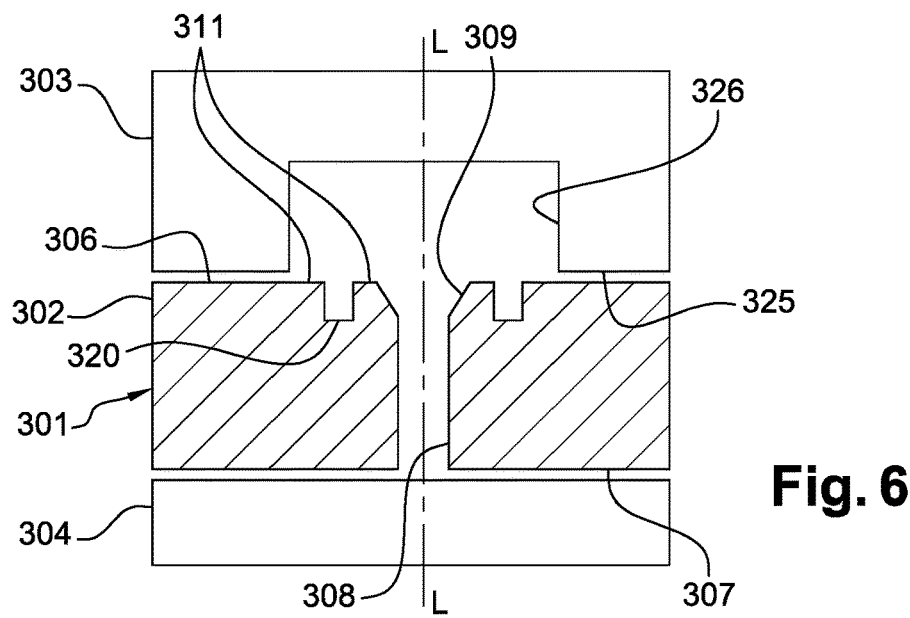
FIG. 6 is a sectional view of a valve according to a third embodiment of the invention.

FIG. 6 shows a valve 301 according to a third embodiment of the invention. Elements that are identical or similar to elements of the second embodiment are denoted by the same reference numerals increased by 100 and will not be described in greater detail. The valve 301 is designed to interact with a first component 303 that has a central recess 326. The component 303 is in contact with the contact surface 306 of the valve body 302 via a contact edge 325. The body 302 does not comprise a recess similar to the recess 210. On the contrary, the intermediate surface 311 is located in the same plane as the contact surface 306. The limit between the intermediate surface 311 and the contact surface 306 is defined by the position of the recess 326.

Figure 7:
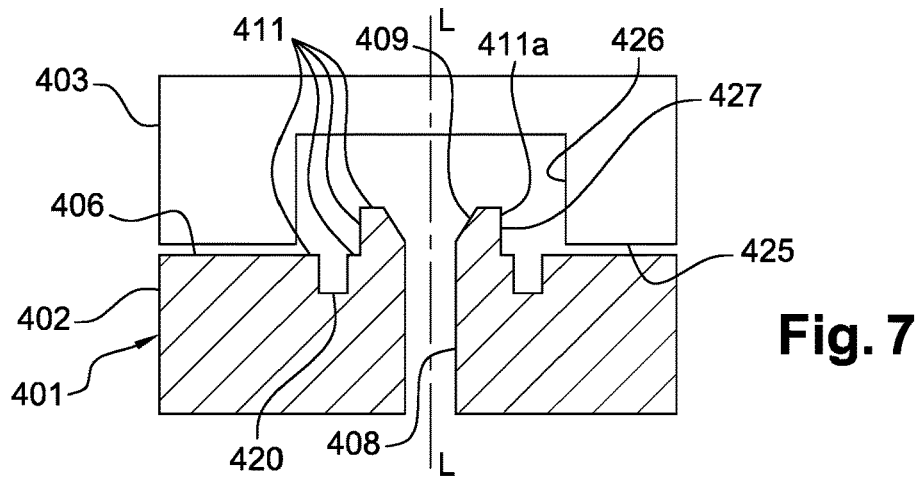
FIG. 7 is a sectional view of a valve according to a fourth embodiment of the invention.

FIG. 7 shows a valve 401 according to a fourth embodiment of the invention. Elements that are identical or similar to elements of FIG. 6 are denoted by the same references increased by 100 and will not be described in greater detail. The valve body 402 comprises a portion 427 that projects in the direction of the axis L beyond the plane defined by the contact surface 406. The intermediate surface 411 that extends from the valve member seat 409 to the contact surface 406 comprises a circular cylindrical portion 411a with a directrix parallel to the axis L.

In the embodiments of FIGS. 5, 6 and 7, the grooves, respectively 220, 320 and 420, isolate the valve member seat 209, 309, 409 to a certain extent relative to the contact surfaces, respectively 206, 306 and 406 in such a manner that, when the first component 203, 303, 403 exerts a pressure on the contact surface 206, 306, 406 the deformation field resulting therefrom is of limited extent at the valve member seat 209, 309, 409.

A valve body according to the invention could exhibit differences as compared to the various embodiments just described.

For example, the channel is not necessarily rectilinear. In this case, when reference is made in the preceding description to the longitudinal axis L of the channel it must be understood that this is the longitudinal axis of the end portion of the channel.

The valve member seat is not necessarily located at the end opening of the channel. In one embodiment that is not shown, the depth d of the groove is not substantially constant throughout the groove. For example, the groove may have a first depth substantially equal to the depth d shown in FIG. 4 over a circular sector of approximately 180° and a second depth that is substantially greater than the first depth of the groove over a circular sector of approximately 180°. In this case, the groove 120 also isolates the channel from the surfaces of contact with the first component in such a manner that when the first component exerts a pressure on the contact surface the channel is not substantially deformed, at least as far as the second depth. The second depth may, for example, correspond to half the length of the channel or correspond to the length of the channel. In this case, the groove transverses the valve body at the portion of the second depth.

The valves described above may be used in a hydraulic and/or pneumatic device, for example in a fuel injector, such as described in document EP 0 957 262, in which the valve is arranged between two components in contact with the valve body and likely to exert a pressure on the valve body. The valves as described above and used in fuel injectors, such as diesel injectors, are used in motor vehicles. The fuel injector comprises a nozzle body in which a movable needle is arranged, sliding in a nozzle body bore, the needle being arranged in a sealed manner relative to the nozzle seat.

The invention claimed is:

1. A valve comprising:
   a valve member; and
   a valve body, said valve body having a contact surface designed to enter into contact with an adjacent contact member, a channel having an end portion opening to an exterior of the valve body at at least one end opening, a valve member seat encircling a passage cross section of said end portion of the channel, and an intermediate surface extending between said contact surface and said end opening;
   wherein said valve member is configured to cooperate with said valve member seat so as to prevent a flow through said end opening;
   wherein said valve body has a groove provided at said intermediate surface, said groove encircling said valve member seat;
   wherein said valve member is configured to cooperate with said valve member seat by contact at a contact zone of said valve member seat;

wherein said groove extends depth-wise parallel to a longitudinal direction of said end portion of the channel at least as far as a depth of said contact zone;

wherein said groove has at least one first portion extending as far as a first groove depth and one second portion extending as far as a second groove depth; and wherein said groove has a circular cylindrical central wall with a directrix parallel to said longitudinal orientation, a back wall extending radially from said circular cylindrical central wall, and a frustoconical exterior wall forming a non-zero angle relative to said longitudinal orientation, which extends from the back wall to said intermediate surface.

2. The valve as claimed in claim 1, wherein said valve member comprises a head configured to cooperate with said valve member seat and also comprises a rod that extends in said channel, said rod having, from said head, a portion of reduced cross section that defines an interior chamber in said channel, and wherein said valve body further comprises a conduit that opens in said interior chamber.

3. The valve as claimed in claim 2, wherein said end portion of the channel has a longitudinal orientation that intersects said intermediate surface at said end opening.

4. The valve as claimed in claim 3, wherein said groove, seen parallel to said longitudinal orientation, is circular.

5. The valve as claimed in claim 4, wherein said end portion of the channel has a circular transverse section, said groove being concentric with said end portion of the channel.

6. The valve as claimed in claim 1, wherein said groove extends depth-wise parallel to the longitudinal direction of said end portion of the channel at least as far as double the depth of said contact zone.

7. The valve as claimed in claim 1, wherein said end portion of the channel has a longitudinal orientation that intersects said intermediate surface at said end opening.

8. The valve as claimed in claim 7, wherein said groove, seen parallel to said longitudinal orientation, is circular.

9. The valve as claimed in claim 8, wherein said end portion of the channel has a circular transverse section, said groove being concentric with said end portion of the channel.

\* \* \* \* \*